United States Patent [19]

Kubli et al.

[11] Patent Number: 4,862,401

[45] Date of Patent: Aug. 29, 1989

[54] APPARATUS, SPECIFICALLY A BALANCE, HAVING A DISPLAY OF RESULTS OF SUCCESSIVE FUNCTION SEQUENCES

[75] Inventors: Rudolf Kubli, Zürich; Hanspeter Wachter, Wallisellen, both of Switzerland

[73] Assignee: Mettler Instruments AG, Greifensee, Switzerland

[21] Appl. No.: 95,650

[22] Filed: Sep. 14, 1987

[30] Foreign Application Priority Data

Sep. 16, 1986 [DE] Fed. Rep. of Germany ....... 3631487

[51] Int. Cl.$^4$ .................... G06F 15/20; G01G 23/28; G01G 23/00
[52] U.S. Cl. .................... 364/710.07; 364/189; 364/466; 177/25.11
[58] Field of Search ............... 364/710, 188, 189, 705, 364/709, 466, 705.01, 709.01, 709.02, 709.03, 709.16, 710.01, 710.02, 710.07; 177/25, 25.11, 25.13, 30, 31, 3

[56] References Cited

U.S. PATENT DOCUMENTS

| | | | |
|---|---|---|---|
| 4,328,875 | 5/1982 | Lechner | 177/25.13 |
| 4,366,873 | 1/1983 | Levy et al. | 364/710 |
| 4,382,280 | 5/1983 | Mandel et al. | 364/710 |
| 4,554,955 | 11/1985 | von Lersner et al. | 364/189 |
| 4,601,355 | 7/1986 | Takahashi | 364/189 |
| 4,693,329 | 9/1987 | Hikita | 364/466 |

Primary Examiner—Gary V. Harkcom
Assistant Examiner—Dale M. Shaw
Attorney, Agent, or Firm—Watson, Cole, Grindle & Watson

[57] ABSTRACT

The apparatus which preferably is designed as a scale or balance comprises a circuit which can execute certain function sequences in succession independent of one another by means of function selecting keys. The circuit comprises a matrix which stores a sequence of functions determined by previously run operations and automatically suggests the sequence to the operator by activating or displaying at least one function key corresponding to this determined sequence. A control key is provided, furthermore, in order to interrupt the automatically suggested sequence at any time and to allow the selection of an arbitrary function from the complete scope of functions.

8 Claims, 3 Drawing Sheets

Fig. 1

| after fncn \ follow fncn | A | B | C |
|---|---|---|---|
| A | Function A was used that often after function A | Fncn B was used that often after fncn A | fncn C was used that often after fncn A |
| B | fncn A was used that often after fncn B | fncn B was used that often after fncn B | fncn C was used that often after fncn B |
| C | fncn A was used that often after fncn C | fncn B was used that often after fncn C | fncn C was used that often after fncn C |

Fig. 2

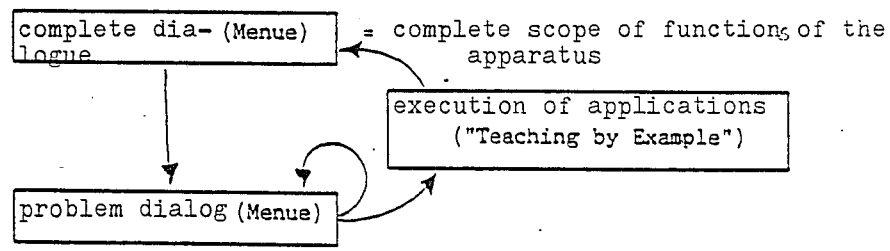

complete dia-(Menue) logue = complete scope of functions of the apparatus execution of applications ("Teaching by Example")

problem dialog (Menue)

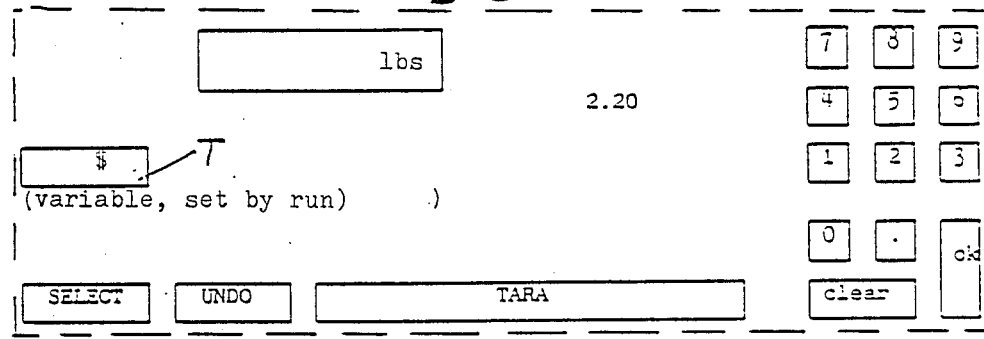
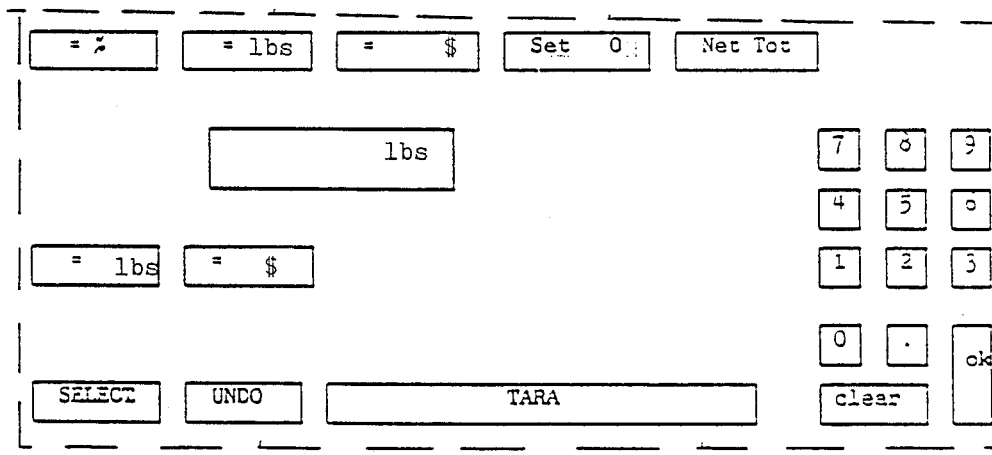

APPARATUS, SPECIFICALLY A BALANCE, HAVING A DISPLAY OF RESULTS OF SUCCESSIVE FUNCTION SEQUENCES

BACKGROUND OF THE INVENTION

1. Field of the Invention

The present invention relates to an apparatus having a display of the results of a succession of function sequences from a variety of function sequences which are carried out by the apparatus independently from each other. The apparatus is provided with a circuit suitable for the running of the functions and with function selection keys corresponding to the complete scope of functions of the apparatus. The invention relates further to a measuring apparatus, specifically a balance having e.g. a digital display for the display of the results of the successively selected function sequences from a menu offered by the software of the apparatus, which is provided with a circuit which is suitable for the running of the functions and with function selection keys corresponding to the complete menu of the apparatus.

2. Description of the Prior Art

The electronic scales or balances presently available on the market are often provided with software which is suitable for a variety of applications. Such scales are provided with a keyboard offering a so-called complete menu from which the operator can recall in succession an arbitrary selection of function sequences. The labeling of the selection keys, the so-called softkeys, proceeds based on a fixed hierarchical menu tree. Because the apparatus must provide a large variety of functions, however, the operator must be very familiar with the problems posed in order to be able to recall the desired functions in their correct order. Because quite often the same or at least similar applications are executed with such apparatuses it would make sense if the operation could be compiled in a more simple manner.

SUMMARY OF THE INVENTION

It is, therefore, an object of the present invention to provide an improved operation for such apparatuses. The operation of the apparatus, specifically a balance, is defined as the execution of an application whereby basically the entire scope of functions is available for the application.

A further object is to provide an apparatus including a circuit comprising a matrix which retains a sequence of functions determined by function sequences of previously run operations and automatically suggests a sequence to the operator by activating or displaying at least one function key corresponding to this sequence for the next step, and includes a control key operative to interrupt the automatically suggested sequence at any time and to allow a switching in of an arbitrary scope of functions.

Yet at further object is to provide such a measuring apparatus in the form of a balance in which the circuit of the apparatus includes a matrix which retains one sequence determined by the function sequences of previously run operations and automatically suggests this sequence to the operator by activating or displaying for the operator at least one function key corresponding to this sequence for the next step, and includes a control key to interrupt the automatically suggested sequence at any time and to allow the selection of an arbitrary function from the complete menu.

This means that the labeling of the softkeys does not proceed on the basis of a fixed hierarchic menu tree, but that rather the earlier selected sequence of functions in a run determines the labeling of the softkeys. Accordingly, the apparatus will be adjusted to a specific problem and yet retain a large variety of functions so that the operation of the apparatus can proceed in an extremely simple manner, in many cases with one single key.

The object is achieved in that the apparatus learns from the problem of the operator or user, respectively.

This simple learning capacity is realized by a statistical evaluation of the past by using a standardized experience matrix. It is, therefore, not necessary to change between a learning mode and an application mode. The experience is continuously increased with every working operation of the apparatus. The experience matrix contains the information of which function was called after which function and how often each has occurred. It is, however, advantageous to perform certain tests in the matrix in order to prevent the running of an impossible sequence of functions. Such plausibility tests may be stored separately in a function linking matrix in the form of heuristic rules.

The matrix provided in the circuit is preferably an experience matrix which determines the function sequence which has been used the most during earlier operations and automatically suggests to the operator a corresponding function sequence. In order to revoke already invoked functions the inverse functions of all functions are available.

The circuit of the apparatus includes preferably additionally a plausibility matrix which checks prior to the running of a function if this function can indeed be run.

BRIEF DESCRIPTION OF THE DRAWINGS

The present invention will be more fully understood by reference to the following detailed description thereof, when read in conjunction with the attached drawings, and wherein:

FIG. 1 illustrates, on a schematic basis only arrangement of an experience matrix;

FIG. 2 is a schematic illustration of the basic concept of the present invention;

FIG. 3 illustrates the operating elements of a balance equipped in accordance with the invention, which in the normal case are visible to the operator;

FIG. 4 illustrates the operating elements of a scale or balance equipped in accordance with the invention after the special control key has been operated (complete menu)

DETAILED DESCRIPTION OF THE PREFERRED EMBODIMENTS

Figure 5:
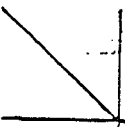
FIG. 5 is a schematic illustration of a plausibility matrix.

The following description refers to a so-called client specific standard scale which, in connection with the present invention, adjusts itself continuously and automatically to the specific application of the operator. Due to the large number of possible combinations of functions, a large number of individual variations of applications can be covered by the software of this standard scale. This process is termed below as "weighing by example", meaning that the operation of the scale will be defined by a previously performed execution of an application. In the case of the labeling of softkeys the selection of function keys proceeds not on the basis of a fixed hierarchic menu tree, but rather it is based on the previously selected sequence of functions in a previous run.

As already mentioned, this is achieved because the apparatus learns from the problem of the operator Such a simple learning capacity is realized in practice by a statistical evaluation of past actions, i.e. by using a standardized experience matrix. The schematics of such an experience matrix are illustrated in FIG. 1 of the drawing.

It is not necessary to change between a learning mode and an application mode. With each operation or run the experience increases. The matrix contains information about which function has been evoked after which function and how often this has occurred.

Further below, the description will enter into more depth as to the possibility of so-called plausibility tests which, if applicable, indicate to the operator that the automatically suggested function sequence is not possible. Such tests can also proceed automatically, whereby the operator receives an information if a function is not allowed to be run.

FIG. 2 of the drawing illustrates schematically the software concept corresponding to the present invention. The figure illustrates that the problem dialogue is a part of the complete dialogue which offers the functions to the operator which he has already once used in an earlier situation. He has, however, at any time the possibility to call up out of the complete menu a new, different function which may proceed via a specific control key: the "select"-key. In the same way the operator can enter at any time new numerical values.

FIG. 3 illustrates how in a practical case those operating elements may look like which are visible to the operator. Adjacent to the display board of a weighing run, at the right hand side, a keyboard for the entering of numerical values for the function is visible. Furthermore, there is a predetermined function selection key T which is variably labeled depending on the given function sequence, a "select" key for interrupting the automatically suggested sequence and the selection of an arbitrary function from the complete function menu, a further key to cancel the automatically suggested sequence, and a tare key common to standard scales. Instead of a single function selection key T there may be also activated two or even more keys, if the specific function sequence selected allows for more than one operation in certain points of the function sequence of a particular application.

If an operator must repeatedly execute a certain function sequence which has been learned by the apparatus, he must merely depress the key T if the function sequence is not to be changed with respect to the learned one (i.e. previous function sequence).

If such a sequence is not desired or if the operator cannot find the desired function, respectively, he can obtain the complete menu by depressing the "select" key and select the desired function from there. This complete menu is in the common style of a hierarchic decision tree.

FIG. 4 of the drawing illustrates those operating elements which are visible to the operator after depressing the "select" key.

The displays of the uppermost line can be superimposed with those of the lower (third) line because they are not used simultaneously.

The application of the above described adaptive key sequence can be used universally for arbitrary menu-based instruments. It is specifically suitable for measuring instruments, although other such apparatusses for which a predetermined function sequence must be executed can be equipped in accordance with the invention.

In order to allow the selection of any key at any time (i.e. any function in any situation), all functions must be completely independent from each other. If such is the case it is also quite easy to add new functions. The respective inverse function makes it possible that the operator can revoke a step in any situation. Accordingly, as already mentioned above, this approach allows a large degree of flexibility for individual configuration. It can be envisaged that e.g. in an industrial plant a specific application is run once with the apparatus by a specifically instructed person (installer, foreman) whereafter the apparatus can be operated for the routine work optimally by a not specifically instructed person.

The display of the respective results may be made on an LCD-display as is common on such apparatuses.

Because all functions (e.g. those primitive for weighing) are completely independent from each other, each key may also have an inverse function that revokes the corresponding function key. If such is the case it is quite easy to revoke via this inverse function key an erroneously triggered function. Such a revoking is possible only once, however, if a one-step memory is used.

FIG. 5 of the drawing illustrates an example of an arrangement of a plausibility matrix. Before a function is run the plausibility matrix checks for which conditions this function may be executed. If these conditions are not met, a corresponding message is given. The illustrated matrix indicates that the function B is not possible after the function C. Similarly, function C can run after function B only if the input is between 0 and 200.

A scale which is equipped according to the invention memorizes the functions which were succeeding each other during which the results of the weighing remained stable. If now the same functions (e.g. converting into ounces, printing of the result and set to zero) are often used in succession by an operator, it makes sense if the scale suggests to combine the three key combinations into a macro. The operator must not go into a macro-learning mode to achieve this task. The operator must allocate merely one name (possibly a number, if no alpha-numeric input is possible) to all three keys. The labeling of the new function (a sequence of functions) contains the name or the number (defined by the operator) and possibly the names of the functions, that comprise the macro. This simplifies the operation of the scale still further.

There is also a question as to what will happen if the same function is used quite often in vastly differing connections. A converting function which is present in strongly differing applications (recipe, statistics control, counting of pieces) is one such example. If a different function was repeatedly used after this converting function, a corresponding number of selection possibilities would be offered on the function keys. Such is obviously not desired and exactly contrary to the preferred one key operation concept. This problem can be solved by forming different converting functions for the various areas of application. This further implies that the various areas of application must be implemented on the uppermost menu step in the complete dialogue. This is at any rate a sensible partitioning strategy and accordingly poses no restriction to the technique.

In some cases it would be desirable for the operator to know which function was executed immediately before the current one. By providing this feature, some unnecessary selection possibilities could be eliminated (see above). It would be merely necessary to keep up a tabulation in which the triple combinations are entered. With this additional information also in the plausibility matrix, conditions such as:

If previously the function A was used, then the number entry must be in a range which is different than if previously function B would have been used.

If several persons work on the same apparatus or if various applications are carried out, the most simple procedure is to use each person's own experience matrix. The operator must identify himself after the apparatus has been switched on.

It is also important that the apparatus does not learn "wrong" key sequences. "Wrong" is to be understood here as new, unwanted key sequences. New key sequences can be learned by the apparatus only if new functions are chosen from the complete dialogue by the "select" key. The "select" key can, however, be removed quite easily, so that only specially designated persons can introduce new key sequences. Also, a mismanipulation can be revoked by the UNDO-key.

The experience matrix also retains information regarding how often a function has been used after another function (all operating steps are taken into account). Thus, the apparatus can, based on certain conditions, cancel keys which are seldom used. "Seldom" can e.g. mean 100 times less than another function. The key which has been used mostly can for instance be brought into the position furthest to the left. If now two functions are used roughly in the same amount (after a given one) the positions of the function keys change continuously. This can be quite confusing to the operator. A sort of a hysteresis or threshold (dead zone) regarding the position change of the keys will eliminate such problems.

A realistic number of various weighing primitives is about 30. For this number of primitives, a memory space requirement of about 2 KBytes without and 20 KBytes with an additional plausibility matrix is required.

The speed of this technique depends mainly on how fast the two matrixes can be sorted and tested. In other respects the speed depends on the same parameters as in the existing software.

It is conceivable that the function keys and the selection keys of the complete dialogue occupy the same location since the two displays are never needed at the same time.

Because the apparatus continually learns it also must be capable to forget the "not-important" sequences. By a standardization of the experience matrix (beyond a certain size of the integer numbers) the numbers which are lower than the rounding threshold get forgotten automatically, or heuristic rules can manipulate the data according to the "age" of the experience.

Due to the clean separation between experience proper (frequency of use of function) and the plausibility information it is possible to separate knowledge of the various applications (weighing primitives) in the plausibility matrix from the standard program proper. We then find a true application knowledge basis in the plausibility matrix. This form of programming corresponds rather exactly to the one which is used in expert systems. In such a form an application expert system would be integrated in a scale. With the experience the apparatus gains during operation it can make suggestions for simplifying the work. Not only the user gathers experience but also the apparatus notices how one could work more efficiently and suggests this to the user.

While we have shown and described a present preferred embodiment of the invention, it is to be understood that the invention is not limited to this embodiment, but may be otherwise variously embodied and implemented within the scope of the following claims.

What is claimed is:

1. Apparatus having a display for the results of function sequences occurring in succession from a variety of function sequences which can be run by the apparatus independently from each other, comprising:

means for implementing the function sequences and including function selection keys corresponding to the complete scope of functions of the apparatus, matrix-like organized storage blocks that retain one sequence based on the function sequences of previously run operations and automatically suggest this sequence to the operator by activation or is playing at least one function key corresponding to this sequence or the next step, a plausibility matrix which checks, prior to the running of a function, if the function can be executed; and a control key operative to interrupt the automatically suggested sequence at any time and to allow the selection of an arbitrary function of the complete scope of functions.

2. The apparatus of claim 1, wherein the matrix is an experience matrix which determines the function sequence mostly used during previous operations and automatically suggests a corresponding function sequence to the operator.

3. The apparatus of claim 1, wherein the respective inverse function is available for any of the functions.

4. Measuring apparatus with a balance having a digital display for the results of function sequences occurring in succession from a menu offered by the software of the apparatus, comprising:

means for implementing the functions and including selection keys corresponding to the complete menu of the apparatus, a matrix which retains one sequence determined on the basis of function sequences of previously run operations and automatically suggest this sequence to the operator by activating or displaying to the operator at least one function key corresponding to this determined sequence for the next following step, a plausibility matrix which checks prior to the running of a function if the function can be executed; and a control key operative to interrupt the automatically suggested sequence at any time and to allow the selection of an arbitrary function from the complete menu.

5. The measuring apparatus of claim 4, wherein the matrix is an experience matrix which determines the function sequence most used during previous operations and automatically suggests the corresponding function sequence to the operator.

6. The measuring apparatus of claim 4, wherein the respective inverse function is available for any of the functions.

7. Apparatus having a display for the results of function sequences occurring in succession from a variety of function sequences which can be run by the apparatus independently from each other, comprising:

means for implementing the function and including function selection keys corresponding to the complete scope of functions of the apparatus, matrix-like organized storage blocks that retain one sequence based on the function sequences of previously run operations and automatically suggest this sequence to the operator by activation or displaying at least one function key corresponding to this sequence for the next step;

a control key operative to interrupt the automatically suggested sequence at any time and to allow the selection of an arbitrary function of the complete scope of functions; and a predetermined function selecting key for the triggering of the next function of a determined function sequence, said selecting key being indicated by a variable label determined by the function sequence.

8. Measuring apparatus with a balance having a digital display for the results of function sequence occurring in succession from a menu offered by the software of the apparatus, comprising:

means for implementing the functions and with selection keys corresponding to the complete menu of the apparatus, a matrix which retains one sequence determined on the basis of function sequences of previously run operations and automatically suggest this sequence to the operator by activating or displaying to the operator at least one function key corresponding to this determined sequence for the next following step;

a control key operative to interrupt the automatically suggested sequence at any time and to allow the selection of an arbitrary function form the complete menu; and a predetermined function selecting key for the triggering of the next function of a determined function sequence, said selecting key being indicated by a variable label determined by the function sequence.

* * * * *